May 7, 1940.　　　D. H. HEYNAU　　　2,199,491
FRICTION GEAR TRANSMISSION
Filed Feb. 14, 1939　　　3 Sheets-Sheet 1

INVENTOR.
DAVID HANS HEYNAU
BY
*A. K. Parsons*
ATTORNEY.

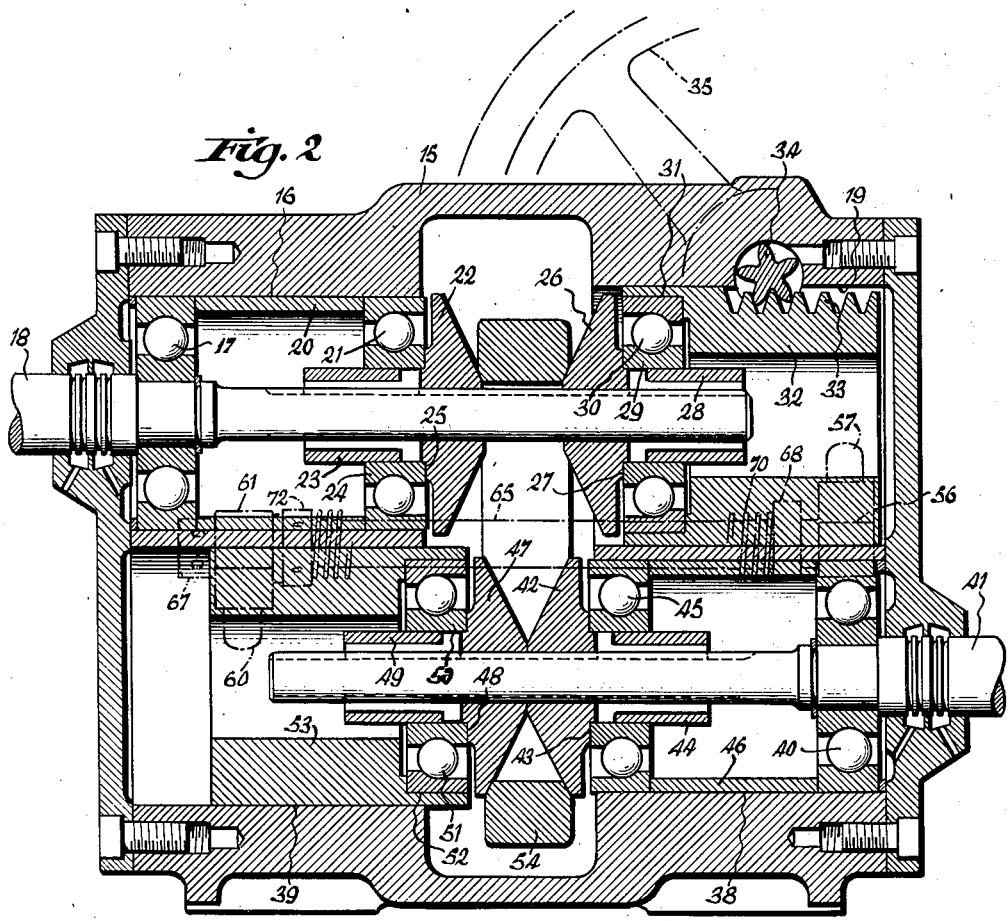

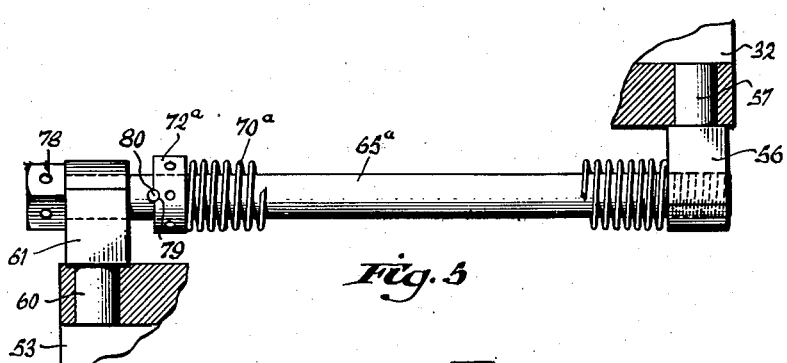
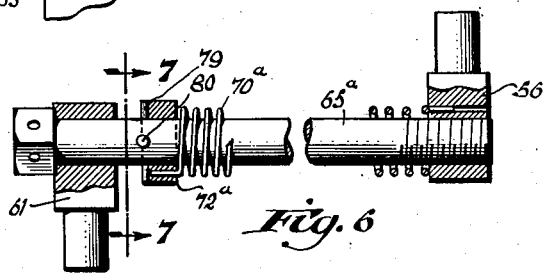
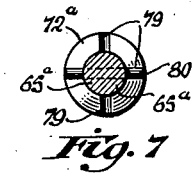
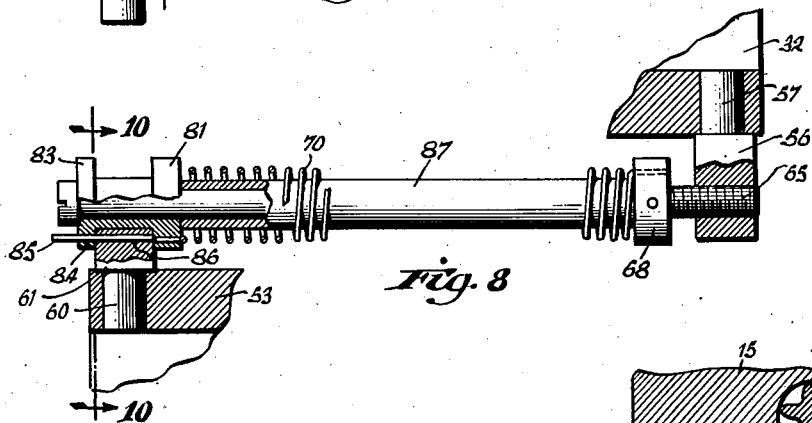
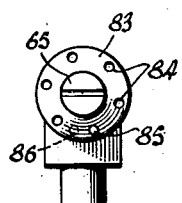
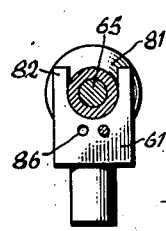
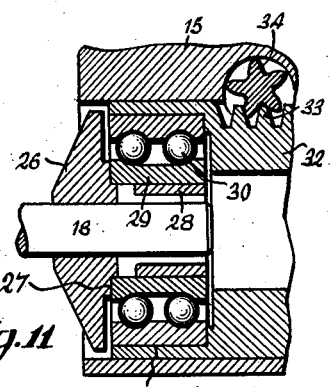

Patented May 7, 1940

2,199,491

UNITED STATES PATENT OFFICE 2,199,491

FRICTION GEAR TRANSMISSION

David Hans Heynau, Cincinnati, Ohio

Application February 14, 1939, Serial No. 256,327

10 Claims. (Cl. 74—193)

This invention relates to improvements in friction gear transmission and has particular reference to improvements in the type of transmission shown in my previous Patent No. 2,032,015.

One of the objects of the present invention is the provision of an improved structure of this character which will insure maximum rigidity of the parts when in use and thus eliminate any possible slippage in the drive.

A further object of the present invention is the provision in a structure of this character of improved means for effecting relative adjustment of the parts for attaining proper frictional relationship therebetween.

A further object of the invention is the provision of an adjusting mechanism which shall be automatic in operation for proper maintenance and re-establishment of prescribed relationship of the friction drive elements, irrespective of wear of the parts in service, and which eliminates the necessity of disassembly of the unit or refitting of the parts after appreciable service.

A further object of the invention is the provision of a structure of this character in which the reactional character of the adjusting mechanism may be readily varied as desired.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Figure 2 represents a longitudinal sectional view taken as on the line 2—2 of Figure 1.

Figure 3 represents a view in elevation of the automatic adjusting mechanism and associate parts with a portion of the enclosing casing broken away.

Figure 5 is a detail view of a modified form of adjusting mechanism.

Figure 6 is a fragmentary sectional view of the parts shown in Figure 5.

Figure 7 is a section as on the line 7—7 of Figure 6.

Figure 8 is a view similar to Figure 5 of a different form of adjusting mechanism.

Figure 9 is an end view thereof.

Figure 10 is a section as on the line 10—10 of Figure 8, and

Figure 11 is a fragmentary sectional view showing a double row bearing support for the friction members.

Figure 1:
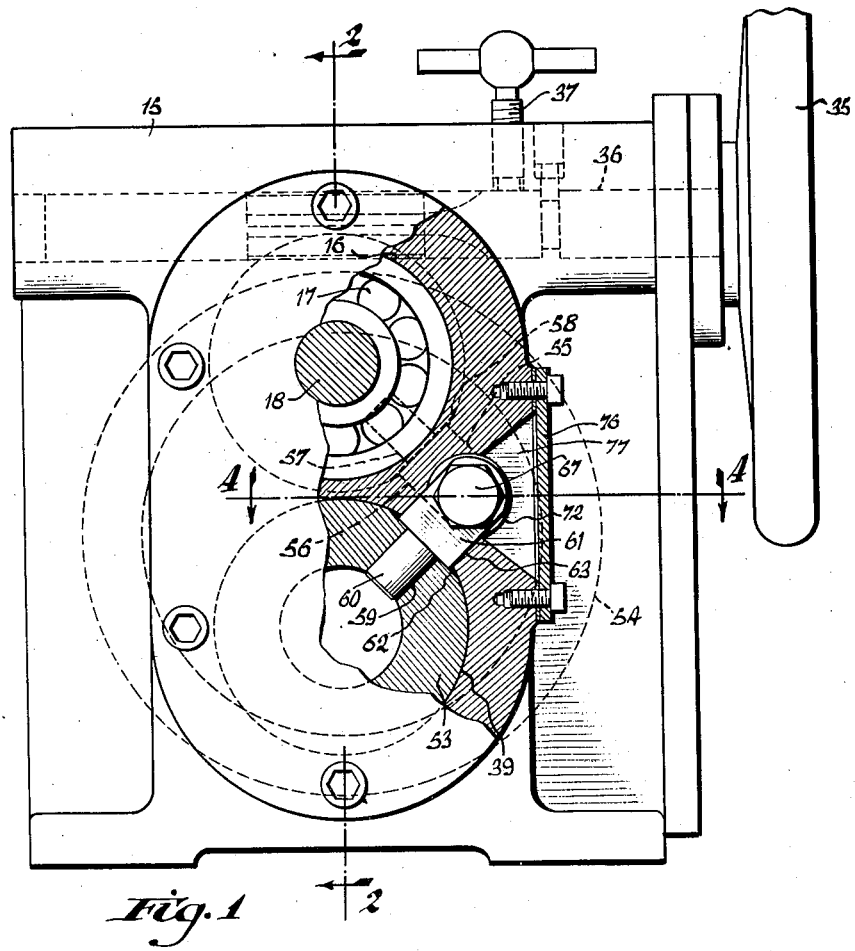
Figure 1 represents an end view with parts broken away of my improved friction gear transmission.

In the drawings in which similar characters of reference are employed to denote similar or corresponding parts throughout the several views, the numeral 15 designates the casing of my friction gear transmission having formed therein two pairs of axially aligned bores of similar but oppositely arranged construction.

In the upper portion of the casing has been illustrated the bore 16 receiving the anti-friction bearing 17 for the input shaft 18 which projects longitudinally of the casing within the aligned bore 19. Fixed within the bore 16 is a sleeve 20 forming the outer support for the anti-friction bearing 21 which may be of either a single row or double row ball bearing type as illustrated respectively in Figures 2 and 11.

Slidably keyed on shaft 18 is a friction drive cone 22 having a hub or sleeve portion 23 internally fitting the inner race 24 of the anti-friction bearing, the cone additionally having a seat as at 25 interfitting with the end of race 24 so that the race supports the cone member for rotation with the shaft 18 but against either tilting or axial shifting movement.

Opposed to the cone 22 is a second cone 26 also keyed on shaft 18 and having a face 27 and hub 28 engaging inner race 29 of anti-friction bearing 30. This bearing 30, in place of being fixedly mounted in a bore of the casing, as described in connection with the bearing 21, is mounted in a recess 31 formed in the sliding sleeve 32 which is mounted for axial movement in bore 19 but restrained against rotative movement with respect thereto as hereinafter described.

Sleeve 32 is formed with rack teeth 33 engaged by adjusting pinion 34 operable through hand wheel 35 on shaft 36 for effecting desired axial movement of the sleeve. A clamp screw or locking member 37 may be utilized, if desired, for securing shaft 36 against rotative movement as when the unit is to be set for an appreciable period to produce a selected definite speed variation.

Formed in the lower portion of the casing is a second pair of axially aligned bores 38 and 39 corresponding respectively to the bores 16 and 19 but positively arranged. Bore 38 has mounted therein the anti-friction bearing 40 for output shaft 41 on which is keyed cone 42 having face 43 and hub 44 interengaged with anti-friction bearing 45 which is also mounted in bore 38 and maintained in spaced relation with respect to anti-friction bearing 40 as by the bush 46.

Shaft 41 extends into bore 39 and has additionally mounted thereon the second cone 47 having seat 48 and hub 49 interengaged with inner race 50 of anti-friction bearing 51 seated in a suitable recess 52 of bushing 53 which is slidably mounted in bore 39.

A rigid friction drive ring 54 serves to transmit motion by way of the sets of cones from shaft 18 to shaft 41 at variable rates depending on the relative spacing of the pairs of cones 22—26 and 42—47 as in my previous patent.

It will be understood that the member 54 is in the form of a rigid circular ring frictionally engaging the faces of the two pairs of cones and that as the pair of cones 22—26 are moved toward each other from the position shown in Figure 2 it is necessary that the cones 42—47 be correspondingly separated, thus causing an increase in the rate of speed transmitted from shaft 18 to shaft 41 and being effectible by rotation of hand wheel 35.

It will be understood that from the nature of the construction, cones 22 and 42 are definitely supported by the casing in fixed and presumably unvarying position, one with respect to the other, and that it is likewise necessary in order that proper driving friction be maintained that cones 26 and 47 be correspondingly maintained in definite relative position irrespective of their adjustment with regard to the casing.

In accomplishment of this result the bore 19 has formed at one side thereof the slot 55 receiving the sliding block 56 having a tang or stud 57 fitting a suitable socket in the sleeve or bushing 32. At the same time the bushing is formed with a flat as at 58 against which the block sits, thus forming a key or lock to prevent rotary movement of the sliding bushing.

Bushing 53 is likewise formed with a recess or seat at 59 to receive stud 60 on sliding block 61 and has a flat as at 62 into which the block fits. This block is in turn slidable in slot 63 of the casing and forms a key or lock preventing rotary movement of the bushing 53.

Figure 4:
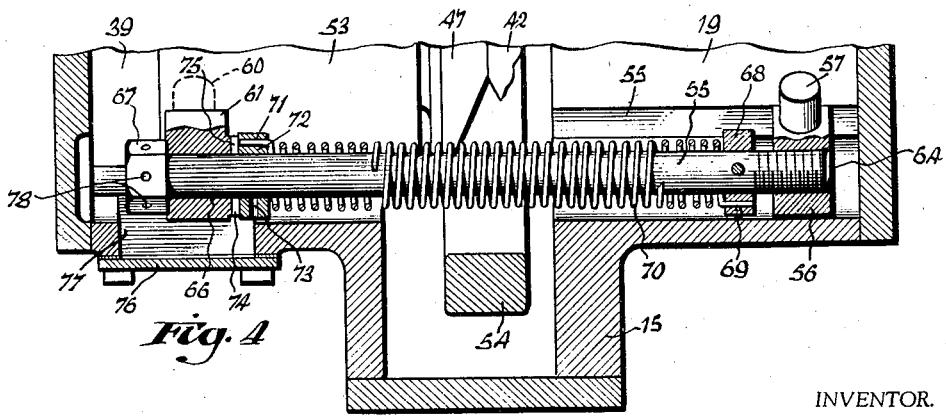
Figure 4 represents a fragmentary sectional view as on the line 4—4 of Figure 1.

These blocks 56 and 61 constitute a part of my improved compensating mechanism; one of said blocks 56, as indicated in Figure 4, has an internal threaded recess at 64 to receive one end of the threaded member or bolt 65 which extends longitudinally of the casing 15 through a plain bore or aperture 66 in block 61 and has at its opposite end the hexagonal head 67 bearing against the outer face of the block.

It will thus be seen that by clockwise rotation of member 65 the two blocks will be drawn toward each other, imparting a corresponding movement to the cones 26 and 47 as for initial setting up purposes.

In order that the desired tension between these cones may be maintained under varying service conditions, occasioning wear either in cones, ring, bearings or other parts of the mechanism, or on account of stretching or elongation of the member 65 itself, I have provided the member with an automatic take-up mechanism.

As shown in Figure 4, there is pinned to member 65 a washer 68 having a recess or socket at 69 to receive one end of the elongated torsion spring 70 circumscribing member 65. At its opposite end, spring 70 is received in socket 71 of the adjustable collar 72 having wrench receiving sockets 73, facilitating its rotation and provided on its outer face with ratchet teeth 74 for selective interlocking engagement with a similar oppositely disposed source of ratchet teeth 75 formed on the inner face of the block 61.

It will be noted that the casing 15 is preferably provided with a removable cover plate 76 normally closing access aperture 77 overlying head 67 and collar 72 when these parts are in their left-hand position. Head 67 has wrench receiving sockets 78 by which it may be rotated to produce desired initial tension in member 65 and held in that position during adjustment of collar 72. Collar 72 may then be rotated, winding up or tensioning spring 70—the normal longitudinal extension of the spring causing interlocking of the ratchet teeth 74 and 75 to secure the collar into desired adjusted position with the spring under suitable tension.

In this manner a continuous rotational urge is imparted by the spring to member 65 which is, however, ineffective so long as the various parts are in tight fitting relation. However, should any play develop due to wear or the like, as above referred to, the unwinding tendency of the spring will serve to compensate for such wear by taking up automatically any looseness or play between the various parts, in that member 65 will be screwed into the threaded recess or nut portion of drawing blocks 56 and 61 toward each other. It will, of course, be understood that the pitch angle of the threads are such that reverse or loosening movement of the parts under any condition is definitely prevented.

The general operation of the structure shown in Figures 5, 6 and 7 is the same as that just described with the exception that in these views the spring 70a has one end directly interengaged with block 56 and the other end engaged with rotary collar 72a having grooves 79 in its face for interengagement with pin 80 carried by the member 65a. Here, as before, we have the condition that an automatically-acting torsion spring is provided, having one end anchored to one of the blocks and the other to the screw or counter-acting member for automatically imparting constant rotational urge thereto to take up wear between the parts.

A further detail modification of the above principle is shown in Figures 8, 9 and 10 in which, as in Figure 4, the member 65 has secured thereon the collar 68 interfitting with one end of spring 70. The opposite end of spring 70 is here shown as interengaged with a flange bushing 81 rotatable on member 65 and having a reduced portion fitting within the yoke arms 82 of block 61. One of the flanges 83 of this bushing has a plurality of apertures 84 for selective reception of a locking pin 85 adapted to be jointly engaged in said aperture in one of the sockets 86 formed in the block, whereby this pin serves both to secure the bushing as an entirety to the block and also to lock the same in selectively rotated position for establishing of desired tension in spring 70.

In this form of the invention, if desired, a second sleeve or bushing 87 may be interposed between the collar 68 and member 81, holding these parts in prescribed spaced relation and forming a center or core for location of spring 70.

From the foregoing description considered in connection with the accompanying drawings, it will be noted that I have provided, in connection with my improved friction gear transmission, a space maintaining or take-up mechanism which will automatically compensate for any initial or subsequently developing looseness in the various parts of my transmission, arising either from undue wear or otherwise—which will, therefore, maintain the several friction surfaces in definite relationship for most efficient operation and in which the potential adjusting tension may be readily varied either at the time of initial assembly or subsequent thereto without any tearing down or disassembly of the several parts of the transmission unit.

What is claimed is:

1. In a variable speed transmission of the type comprising spaced pairs of adjustable cone pulleys and an interfitting rigid connecting ring in which one cone of each pair must be simultaneously adjusted in a corresponding direction for effecting variations in speed, means for maintaining said adjustable pulley sections with their operative faces in prescribed relation one to the other for engagement with the rigid connection ring, said means comprising an adjustable member directly connecting the adjustable sections of the respective pulleys and a torsion device for effecting rotary adjustment of the member.

2. In a variable speed transmission of the type comprising spaced pairs of adjustable cone pulleys and an interfitting rigid connection ring in which one cone of each pair must be simultaneously adjusted in a corresponding direction for effecting variations in speed, means for maintaining said adjustable pulley sections with their operative faces in prescribed relation one to the other for engagement with the rigid connection ring, said means comprising an adjustable connecting member and a torsion device for effecting rotary adjustment thereof, and means for variably determining the torsional effect of said torsion device.

3. In an adjustable speed mechanism of the type embodying a first co-axially disposed pair of opposed cone members providing an adjustable cone pulley, a second pair of similar members forming a second cone pulley and a rigid drive ring interfitting the cone portions of the respective pulleys, each of said pulleys having an adjustable cone section, of a member connecting the adjustable cone sections of the respective pulleys, said member having a threaded portion interengaged with a threaded member on the pulley whereby the cones may be relatively adjusted by rotation of one of said threaded members, means for effecting an initial adjustment of said parts, and additional torsion means reacting on one of said threaded members in a direction to effect relative approach of the connected cone members whereby automatically to compensate for maladjustment or wear of the associate parts.

4. A device of the character described including a support having a pair of aligned bores connected by transverse passage, a pair of split pulley sections aligned with one of said bores having an adjustable section slidably mounted in the bore, a second pair of split pulley members mounted in alignment with the other bore, one of said split pulley members being slidably mounted in the bore in opposite relation to the first-mentioned slidable member, said bores having angularly related longitudinal slots formed in the lateral walls thereof, lug members slidable in the slots and having portions interengaged with the slidable pulley members, a connector carried by one of said lugs and in threaded engagement with the other thereof whereby rotation of the connector will effect relative axial shifting of the slidably mounted members, and a torsion device circumscribing said connecting member having one end secured in fixed relation to the connecting member and the other end adjustable relative thereto for determination of the torsional reaction thereof on the connecting member whereby said member will be automatically adjusted by the torsion member to compensate for looseness in the connected parts.

5. A device of the character described including a support having a pair of aligned bores connected by transverse passage, a pair of split pulley sections aligned with one of said bores having an adjustable section slidably mounted in the bore, a second pair of split pulley members mounted in alignment with the other bore, one of said split pulley members being slidably mounted in the bore in opposite relation to the first-mentioned slidable member, said bores having angularly related longitudinal slots formed in the lateral walls thereof, lug members slidable in the slots and having portions interengaged with the slidable pulley members, a connector carried by one of said lugs and in threaded engagement with the other thereof whereby rotation of the connector will effect relative axial shifting of the slidably mounted members, and a torsion device circumscribing said connecting member having one end secured in fixed relation to the connecting member and the other end adjustable relative thereto for determination of the torsional reaction thereof on the connecting member, and means for securing the torsion member in selected adjusted position.

6. A device of the character described including a support having a pair of aligned bores connected by transverse passage, a pair of split pulley sections aligned with one of said bores having an adjustable section slidably mounted in the bore, a second pair of split pulley members mounted in alignment with the other bore, one of said split pulley members being slidably mounted in the bore in opposite relation to the first-mentioned slidable member, said bores having angularly related longitudinal slots formed in the lateral walls thereof, lug members slidable in the slots and having portions interengaged with the slidable pulley members, a connector carried by one of said lugs and in threaded engagement with the other thereof, whereby rotation of the connector will effect relative axial shifting of the slidably mounted members, and a torsion device circumscribing said connecting member having one end secured in fixed relation to the connecting member and the other end adjustable relative thereto for determination of the torsional reaction thereof on the connecting member whereby said member will be automatically adjusted by the torsion member to compensate for looseness in the connected parts, said support having a normally closed access aperture formed therein, and means on the connecting member accessible by way of the aperture for effecting desired adjustments thereof.

7. In a variable speed transmission of the character disclosed embodying a pair of split cone pulleys, each having an adjustable section and a rigid ring interposed between and connecting said pulleys for transmission of power therebetween at a variable rate dependent on the relative adjustment of the pulley sections, of connector receiving lugs carried by the respective adjustable pulley sections, a connector member interposed between said lugs, said member having a threaded portion interengaged with a corresponding threaded portion on one of the lugs and having an abutment portion rotatable but non-translatable intergaged with the other of said lugs whereby upon rotation of said member the lugs and thus the respective cone sections may be drawn into close interfitting engagement with the respective adjacent portions of the interposed rigid driving ring, and means for maintaining said close interfitting engagement of the parts comprising a torsion member having a portion interengaged with the connecting member in a manner to effect a tightening rotation thereof, said interengaged threaded portions having a flat angle locking the connector against reverse rotation.

8. In a variable speed transmission of the character disclosed embodying a pair of split cone pulleys, each having an adjustable section and a rigid ring interposed between and connecting said pulleys for transmission of power therebetween at a variable rate dependent on the relative adjustment of the pulley sections, of connector receiving lugs carried by the respective adjustable pulley sections, a connector member interposed between said lugs, said member having a threaded portion interengaged with a corresponding threaded portion on one of the lugs and having an abutment portion rotatable but non-translatable interengaged with the other of said lugs whereby upon rotation of said member the lugs and thus the respective cone sections may be drawn into close interfitting engagement with the respective adjacent portions of the interposed rigid driving ring, means for maintaining said close interfitting engagement of the parts comprising a torsion member having a portion interengaged with the connecting member in a manner to effect a tightening rotation thereof, said interengaged threaded portions having a flat angle locking the connector against reverse rotation, and means for variably adjusting the tension member to determine the rotational force exerted thereby against the connecting member.

9. In a variable speed transmission of the character disclosed embodying a pair of split cone pulleys, each having an adjustable section and a rigid ring interposed between and connecting said pulleys for transmission of power therebetween at a variable rate dependent on the relative adjustment of the pulley sections, of connector receiving lugs carried by the respective adjustable pulley sections, a connector member interposed between said lugs, said member having a threaded portion interengaged with a corresponding threaded portion on one of the lugs and having an abutment portion rotatable but non-translatable interengaged with the other of said lugs whereby upon rotation of said member the lugs and thus the respective cone sections may be drawn into close interfitting engagement with the respective adjacent portions of the interposed rigid driving ring, means for maintaining said close interfitting engagement of the parts comprising a torsion member having a portion interengaged with the connecting member in a manner to effect a tightening rotation thereof, said interengaged threaded portions having a flat angle locking the connector against reverse rotation, means for variably adjusting the tension member to determine the rotational force exerted thereby against the connecting member, and means for locking the parts in prescribed torsionally adjusted relation.

10. In a mechanism of the character described, the combination with a pair of spaced adjustable cone pulleys and a rigid connecting ring mutually interfitting with said pulleys, said pulleys each comprising a relatively fixed and relatively movable member, the movable members being disposed in opposed relation and supported for joint axial reciprocation whereby the effective diameters of the pulleys may be simultaneously varied while maintaining frictional engagement of the ring therewith, means for imparting axial movement to one of said pulley sections, and means for maintaining said adjustable sections in prescribed engagement with the interposed ring comprising a connecting member having a portion abutting one of said adjustable sections and a second portion in threaded engagement with the other of said sections for effecting relative approach of the sections one with respect to the other in an axial direction, a torsion spring circumscribing the connecting member, means for securing one end of the spring to the connecting member, and means for adjustably varying the torsional reaction of the secured end on the connecting member comprising a collar carried by the other end of the spring and rotatably mounted on the connection member, means for effecting rotation of the collar to vary the torsion of the spring, and interlocking means on the collar and adjacent pulley section unit for securing the collar in desired rotatively adjusted position to maintain the torsion effect produced by rotary adjustment of the collar whereby said torsion member will exert a force tending to rotate the connecting member to maintain the pulley sections in tight interfitting engagement with said rigid ring.

DAVID HANS HEYNAU.